United States Patent
Nakamura et al.

(10) Patent No.: US 11,578,153 B2
(45) Date of Patent: Feb. 14, 2023

(54) PHOTOCURABLE RESIN COMPOSITION

(71) Applicant: DEXERIALS CORPORATION, Tokyo (JP)

(72) Inventors: Tsukasa Nakamura, Tochigi (JP); Daisuke Hara, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 16/634,769

(22) PCT Filed: Dec. 13, 2017

(86) PCT No.: PCT/JP2017/044797
§ 371 (c)(1),
(2) Date: Jan. 28, 2020

(87) PCT Pub. No.: WO2019/116479
PCT Pub. Date: Jun. 20, 2019

(65) Prior Publication Data
US 2020/0207890 A1 Jul. 2, 2020

(51) Int. Cl.
*C08F 120/56* (2006.01)
*C08F 120/18* (2006.01)
*C08F 120/28* (2006.01)

(52) U.S. Cl.
CPC .......... *C08F 120/56* (2013.01); *C08F 120/18* (2013.01); *C08F 120/28* (2013.01)

(58) Field of Classification Search
CPC .... C08F 2/44; C08F 2/48; C08F 20/18; C08F 20/26; C08F 20/56; C08F 120/28; C08F 120/18; C08F 120/30; C08F 120/54; C08F 120/56; C09J 4/00

USPC .......................................... 522/120, 121, 113
See application file for complete search history.

(56) References Cited

U.S. PATENT DOCUMENTS

2018/0201808 A1* 7/2018 Sugawara ................ C09J 11/06

FOREIGN PATENT DOCUMENTS

| JP | 2013-151151 A | 8/2013 |
| JP | 2014-199346 A | 10/2014 |
| WO | 2013/115250 A1 | 8/2013 |

OTHER PUBLICATIONS

Feb. 27, 2018 International Search Report issued in International Patent Application No. PCT/JP2017/044797.
Feb. 3, 2020 Chinese Office Action issued in Chinese Patent Application No. 201780033877.2.
Sep. 11, 2020 Office Action issued in Korean Patent Application No. 10-2019-7028927.
Dec. 29, 2021 Notification of Reasons for Refusal issued in Korean Patent Application No. 10-2021-7026456.

* cited by examiner

*Primary Examiner* — Sanza L. McClendon
(74) *Attorney, Agent, or Firm* — Oliff PLC (57) ABSTRACT

A photocurable resin composition which can improve adhesion between light transmitting members. The photocurable resin composition contains a monofunctional acrylic monomer having a heating residue of 85.0% or less after being heated at 60° C. for 30 minutes, a crosslinking agent, a photopolymerization initiator, and a softening agent composed of at least one of plasticizer and tackifier, and the heating residue after being heated at 60° C. for 30 minutes is less than 96.0%.

13 Claims, 7 Drawing Sheets

PHOTOCURABLE RESIN COMPOSITION

TECHNICAL FIELD

The present disclosure relates to a photocurable resin composition.

BACKGROUND ART

Conventionally, there has been known a technique in which light transmitting members are bonded together with a photocurable resin composition and fixed with a light transmitting resin layer. For example, PLT 1 discloses a method in which a liquid photocurable resin composition is applied to an image display member, the liquid photocurable resin composition is precured to form a precured resin layer, a light transmitting member is bonded to the precured resin layer, and the precured resin layer is final-cured.

However, the method described in PLT 1 tends to be affected by curing inhibition by oxygen since the photocurable resin composition is cured in a state exposed to air in the atmosphere. Therefore, the surface of the precured resin layer is not cured sufficiently, and liquid components might remain on the surface. If the light transmitting member and the image display member are bonded to each other in such a state that a liquid component remains on the surface, a slippage tends to occur after the bonding, and adhesion might be insufficient.

CITATION LIST

Patent Literature

PLT 1: Japanese Unexamined Patent Application Publication No. 2013-151151

SUMMARY OF INVENTION

Technical Problem

The present disclosure has been proposed in view of such conventional circumstances, and provides a photocurable resin composition which can improve adhesion between light transmitting members.

Solution to Problem

The photocurable resin composition contains a monofunctional acrylic monomer having a heating residue of 85.0% or less after being heated at 60° C. for 30 minutes, a crosslinking agent, a photopolymerization initiator, and a softening agent composed of at least one of plasticizer and tackifier, and the heating residue after being heated at 60° C. for 30 minutes is less than 96.0%.

Advantageous Effects of Invention

According to the present disclosure, it is possible to improve the adhesion between light transmitting members.

BRIEF DESCRIPTION OF DRAWINGS

FIG. 3 (A) is a perspective view illustrating an example of a light transmitting member coated with a photocurable resin composition, and FIG. 3 (B) is a cross-sectional view taken along the line A-A' in FIG. 3 (A).

FIG. 4 (A) is a perspective view for explaining an example of a step of irradiating light to a photocurable resin composition applied to the surface of a light transmitting member to form a precured resin layer, and FIG. 4 (B) is a cross-sectional view taken along the line A-A' in FIG. 4 (A).

FIG. 5 (A) is a perspective view for explaining an example of a step of drying the surface of the precured resin layer, and FIG. 5 (B) is a cross-sectional view taken along the line A-A' in FIG. 5 (A).

FIG. 6 (A) is a perspective view for explaining an example of a step of drying the surface of the precured resin layer, and FIG. 6 (B) is a cross-sectional view taken along the line A-A' in FIG. 6 (A).

FIG. 9 (A) is a perspective view for explaining another example of the process of drying the surface of the precured resin layer, and FIG. 9 (B) is a cross-sectional view taken along the line A-A' in FIG. 9 (A).

FIG. 12 (A) is a cross-sectional view illustrating a state in which the photocurable resin composition is irradiated with ultraviolet rays, FIG. 12 (B) is a cross-sectional view illustrating a resin composition layer after the irradiation with ultraviolet rays, and FIG. 12 (C) is a view for explaining a method of a holding force test.

DESCRIPTION OF EMBODIMENTS

Photocurable Resin Composition

The photocurable resin composition according to the present embodiment has a heating residue of less than 96.0% after being heated at 60° C. for 30 minutes. In addition, the photocurable resin composition preferably contains a monofunctional acrylic monomer having a heating residue of 85.0% or less after being heated at 60° C. for 30 minutes (hereinafter also referred to as specific monofunctional acrylic monomers), which will be described later, a crosslinking agent, a photopolymerization initiator, and a softening agent composed of at least one of a plasticizer and a tackifier.

The photocurable resin composition has a heating residue of less than 96%, preferably 94.0% or less, and more preferably 93.0% or less after being heated at 60° C. for 30 minutes. The lower limit value of the heating residue of the photocurable resin composition is preferably 80.0% or more, more preferably 85.0% or more, and still more preferably 90.0% or more, from the viewpoint of the adhesiveness of the member used in, for example, a method for manufacturing a laminate to be described later. Here, the heating residue of the photocurable resin composition is a value obtained by measuring the mass before and after heating 10 mg of the photocurable resin composition at 60° C. for 30 minutes using a calorimeter (device name: Q50, manufactured by TA Instruments). Hereinafter, each component constituting the photocurable resin composition will be described.

Specific Monofunctional Acrylic Monomer

The specific monofunctional acrylic monomer preferably has a heating residue of 85% or less after being heated at 60° C. for 30 minutes. The lower limit value of the heating residue of the specific monofunctional acrylic monomer is preferably 30% or more, more preferably 40% or more, and still more preferably 70% or more, from the viewpoint of the adhesiveness of a member used in, for example, a method for manufacturing a laminate to be described later. Here the heating residue of the specific monofunctional acrylic monomer is a value obtained by measuring the mass before and after heating 10 mg of a specific monofunctional acrylic monomer at 60° C. for 30 minutes using a calorimeter (device name: Q50, manufactured by TA Instruments).

By containing the specific monofunctional acrylic monomer in the photocurable resin composition, for example, the liquid component on the surface of the precured resin layer 11 is more likely to volatilize in step (C) of a method for manufacturing a laminate described later. Therefore, the light transmitting member 3 and the image display member 2 can be bonded to each other more reliably in a state in which no liquid component remains on the surface of the precured resin layer 11. This effectively prevents a slippage from occurring after the light transmitting member 3 and the image display member 2 are bonded and further improves the adhesion between the light transmitting member 3 and the image display member 2. Here, when a monofunctional methacrylate (methacrylic acid ester) or a monofunctional methacrylamide is used as a specific monofunctional acrylic monomer, it is difficult to improve the adhesion between the light transmitting member 3 and the image display member 2.

The specific monofunctional acrylic monomer is preferably at least one of a monofunctional acrylate (acrylic acid ester) which has a heating residue of 85.0% or less after being heated at 60° C. for 30 minutes and a monofunctional acrylamide which has a heating residue of 85.0% or less after being heated at 60° C. for 30 minutes. In particular, from the viewpoint of obtaining a photocurable resin composition having a heating residue less than 96.0% after being heated at 60° C. for 30 minutes, a monofunctional acrylate having a heating residue of 85.0% or less after being heated at 60° C. for 30 minutes is more preferable. The specific monofunctional acrylic monomer is preferably at least one of a compound represented by formula (A), a compound represented by formula (B), and a compound represented by formula (C), and more preferably at least one of a compound represented by formula (B) and a compound represented by formula (C).

formula 1

(A)

(B)

(C)

In formula (A), each of $R^1$ and $R^2$ independently represents an alkyl group having 2 to 4 carbon atoms and is preferably an ethyl group.

In formula (B), $R^3$ represents an alkyl group having 1 to 7 carbon atoms. $R^3$ may be any of linear, branched, or cyclic alkyl groups. $R^3$ may have a substituent or be unsubstituted. When $R^3$ has a substituent, the substituent may include a hydroxyl group. When $R^3$ is a linear or branched alkyl group, the alkyl group preferably has 1 to 7 carbon atoms and more preferably 1 to 4 carbon atoms. When $R^3$ is a cyclic alkyl group, the carbon number of the alkyl group is preferably 3 to 8, more preferably 4 to 7, and still more preferably 5 to 7.

In formula (C), $R^4$ represents an aliphatic heterocyclic group having 3 to 6 carbon atoms. The carbon number of the aliphatic heterocyclic group is preferably 4 to 6, and more preferably 5 or 6. Examples of the heteroatom constituting the aliphatic heterocyclic group include an oxygen atom, a nitrogen atom, and a sulfur atom. $L^1$ represents a single bond or an alkylene group having 1 to 3 carbon atoms. When $L^1$ represents an alkylene group having 1 to 3 carbon atoms, a methylene group or an ethylene group is preferable, and a methylene group is more preferable.

Specific examples of specific monofunctional acrylic monomers are preferably at least one of diethylacrylamide, hydroxypropyl acrylate, cyclohexyl acrylate, and tetrahydrofurfuryl acrylate, more preferably at least one of hydroxypropyl acrylate, cyclohexyl acrylate, and tetrahydrofurfuryl acrylate.

The content of the specific monofunctional acrylic monomer in the photocurable resin composition is preferably 10 to 30 mass %, more preferably 15 to 25 mass %. If the content of the specific monofunctional acrylic monomer is too small, it tends to be difficult to form a photocurable resin composition having less than 96.0% of a heating residue after being heated at 60° C. for 30 minutes. Specific monofunctional acrylic monomers may be used alone or in combination of two or more. When two or more specific monofunctional acrylic monomers are used in combination, the content thereof preferably satisfies the above range of content.

Crosslinking Agent

As the crosslinking agent, for example, a photocurable (meth) acrylate compound having two or more functional groups can be used. Examples of the crosslinking agent include ethylene glycol di (meth) acrylate, diethylene glycol di (meth) acrylate, polyethylene glycol di (meth) acrylate, 1,4-butanediol di (meth) acrylate, 1,6-hexanediol di (meth) acrylate, 1,8-octanediol di (meth) acrylate, and 1,9-nonanediol di (meth) acrylate. As the crosslinking agent, a di (meth) acrylate compound having a backbone of urethane, isoprene, or butadiene may be used. Specific examples of the (meth) acrylate compound having a urethane backbone include aliphatic urethane diacrylate (EBECRYL 230, manufactured by DAICEL-ALLNEX LTD.)

The content of the crosslinking agent in the photocurable resin composition is preferably 0.01 to 20 mass %, more preferably 0.01 to 15 mass %, and still more preferably 0.05 to 15 mass %. When the content of the crosslinking agent is excessively increased, the content of the specific monofunctional acrylic monomer is relatively decreased, and therefore, it tends to be difficult to form a photocurable resin composition having a heating residue of less than 96.0% after being heated at 60° C. for 30 minutes. The crosslinking agent may be used alone or in combination of two or more. When two or more kinds of crosslinking agents are used in combination, it is preferable that the content of the crosslinking agents satisfies the above range of content.

Photopolymerization Initiator

The photopolymerization initiator is preferably a photoradical polymerization initiator, and more preferably contains at least one of an alkylphenone photopolymerization initiator and an acylphosphine oxide photopolymerization initiator. Examples of the alkylphenone photopolymerization initiator include 1-hydroxycyclohexyl phenyl ketone (IRGACURE 184, manufactured by BASF), and 2-hydroxy-1-{[4-(2-Hydroxy-2-methyl-propyronyl) benzyl] phenyl}-2-methyl-1-propane-1-one (IRGACURE 127, manufactured by BASF). As the acylphosphine oxide photopolymerization initiator, 2,4,6-trimethylbenzoyl-diphenyl-phosphine oxide (TPO, manufactured by BASF) may be used. Other examples of the photopolymerization initiator include benzophenone, and acetophenone.

The content of the photopolymerization initiator in the photocurable resin composition is preferably 0.1 to 5 parts by mass, more preferably 0.2 to 3 parts by mass, based on a total of 100 parts by mass of the specific monofunctional acrylic monomer and the crosslinking agent. By setting such a range, it is possible to more effectively prevent insufficient curing at the time of light irradiation and to more effectively prevent an increase in outgas due to cleavage. The photopolymerization initiator may be used alone or in combination of two or more. When two or more photopolymerization initiators are used in combination, it is preferable that the total amount of the photopolymerization initiators satisfies the above range.

Softening Agent

The softening agent is composed of at least one of a plasticizer and a tackifier. The plasticizer does not itself undergo photo-curing by ultraviolet irradiation, and provides flexibility to the photocurable resin composition (cured resin layer or precured resin layer) after curing. For example, a cyclohexanedicarboxylate compound, a polybutadiene compound, and a polyisoprene compound can be used. The tackifier provides flexibility to a photocurable resin composition after curing to improve initial adhesion strength (known as tackiness). Examples of the tackifier include terpene-based resins such as terpene resins, terpene phenolic resins, and hydrogenated terpene resins, rosin resins such as natural rosins, polymerized rosins, rosin esters, and hydrogenated rosins, petroleum resins such as polybutadiene, and polyisoprene, among others.

The content of the softening agent in the photocurable resin composition is preferably 40 to 90 mass %, more preferably 40 to 85 mass %, and still more preferably 50 to 85 mass %. As the softening agent, any one of a plasticizer and a tackifier may be used alone, or two or more may be used in combination. When two or more kinds of softening agents are used in combination, it is preferable that the total amount of the softening agents satisfies the above range.

Other Components

The photocurable resin composition may further contain components other than those described above to the extent that the effect of the present disclosure is not impaired. The photocurable resin composition preferably does not contain substantially other monofunctional acrylic monomers than the specific monofunctional acrylic monomers. Here, "not contain substantially" means that the content of the monofunctional acrylic monomer other than the specific monofunctional acrylic monomer in the photocurable resin composition is preferably 1 mass % or less, more preferably 0.1 mass % or less. In addition, from the viewpoint of the reliability (e.g. suppression of yellowing in high-temperature environments) of the photocurable resin composition after curing, it is preferable that the photocurable resin composition does not substantially contain a thiol-based compound or an amine-based compound as another component.

The photocurable resin composition is preferably liquid at room temperature. Herein, liquid means a state in which viscosity is 0.01 to 100 Pa*s at 25° C. as measured by a B-type viscometer.

The photocurable resin composition can be prepared by uniformly mixing the components described above according to a known mixing method.

Method for Manufacturing a Laminate

Next, a method for manufacturing a laminate using the above-mentioned photocurable resin composition will be described. The method for manufacturing the laminate includes, for example, the following steps (A) to (E), and uses the above-mentioned photocurable resin composition.

Step (A): A photocurable resin composition is applied to the surface of a first light transmitting member.

Step (B): The applied photocurable resin composition is irradiated with light to form a precured resin layer.

Step (C): The surface of the precured resin layer is dried.

Step (D): The first light transmitting member and a second light transmitting member are bonded to each other via the precured resin layer.

Step (E): The precured resin layer is final-cured by irradiation with light.

According to this manufacturing method, by drying the surface of the precured resin layer before step (D), the liquid component on the surface of the precured resin layer can be volatilized. Therefore, the first member and the second member can be bonded to each other with substantially no liquid component remaining on the surface of the precured resin layer. As a result, the first member and the second member can be prevented from slipping after the first member and the second member are bonded, and the adhesion between the first member and the second member can be improved.

Figure 1:
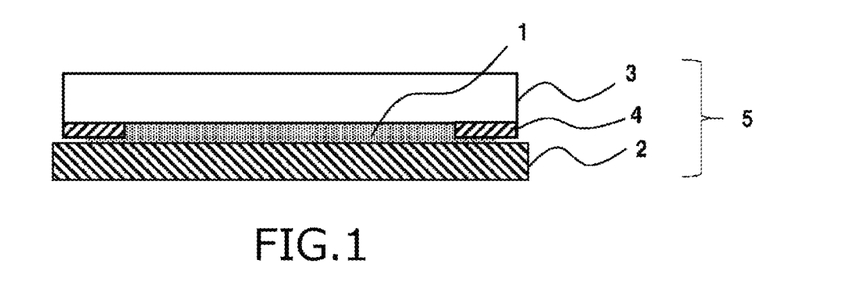
FIG. 1 is a cross-sectional view illustrating an example of an image display device.

Hereinafter, each step will be described in detail with reference to the drawings. For example, as shown in FIG. 1, the present manufacturing method is used to manufacture an image display device 5 (laminate) in which a light transmitting member 3 (first member) having a light shielding layer 4 formed at a peripheral portion thereof and an image display member 2 (second member) are laminated via a cured resin layer 1.

The cured resin layer 1 is formed of a photocurable resin composition 6 which will be described later. The refractive index of the cured resin layer 1 is preferably substantially equal to that of the image display member 2 or the light transmitting member 3, and is preferably, for example, from 1.45 to 1.55. As a result, the brightness and contrast of the image light from the image display member 2 can be enhanced to improve the visibility. The transmittance of the cured resin layer 1 is preferably more than 90%. This makes it possible to improve the visibility of the image formed on the image display member 2. The thickness of the cured resin layer 1 is preferably, for example, 50 to 200 μm.

Examples of the image display member 2 include a liquid crystal display panel, and a touch panel. Here, the touch panel means an image display/input panel that combines a display device such as a liquid crystal display panel and a position input device such as a touch pad.

The light transmitting member 3 may have light transmissivity such that an image formed on the image display member 2 is visible. Examples include plate-like and sheet-like materials such as glass, acrylic resin, polyethylene terephthalate, polyethylene naphthalate, and polycarbonate. These materials may be subjected to hard coating treatment, or anti-reflection treatment, among other treatments on at least one surface. The physical properties such as the thickness and elastic modulus of the light transmitting member 3 can be appropriately determined according to the purpose of use.

The light shielding layer 4 is provided for improving the contrast of an image, and can be formed by applying a coating material colored black or the like by a screen printing method or the like, and drying and curing the coating material. The thickness of the light shielding layer 4 is typically 5 to 100 µm.

Step (A)

Figure 2:
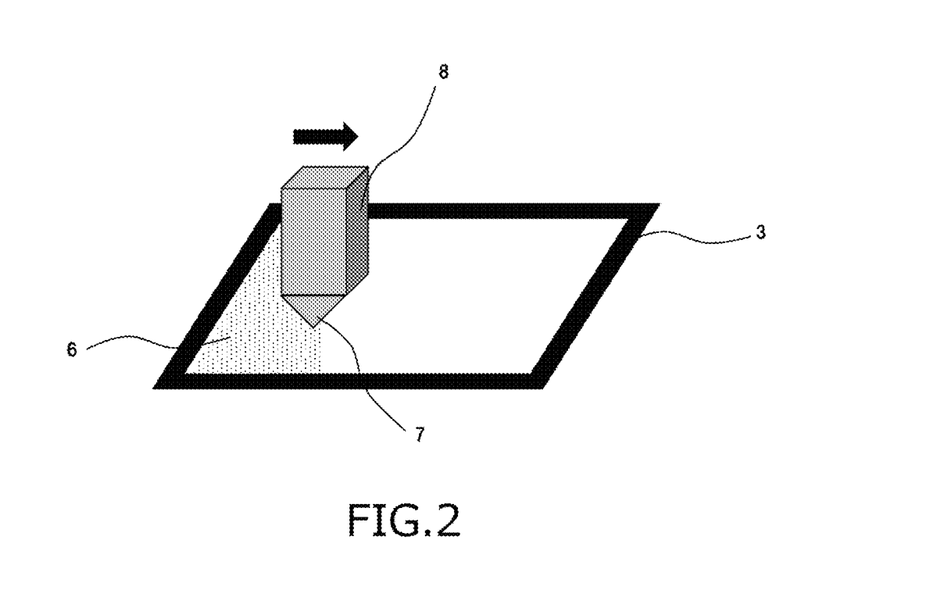
FIG. 2 is a perspective view for explaining an example of a step of applying a photocurable resin composition to the surface of a light transmitting member.
Figure 3:
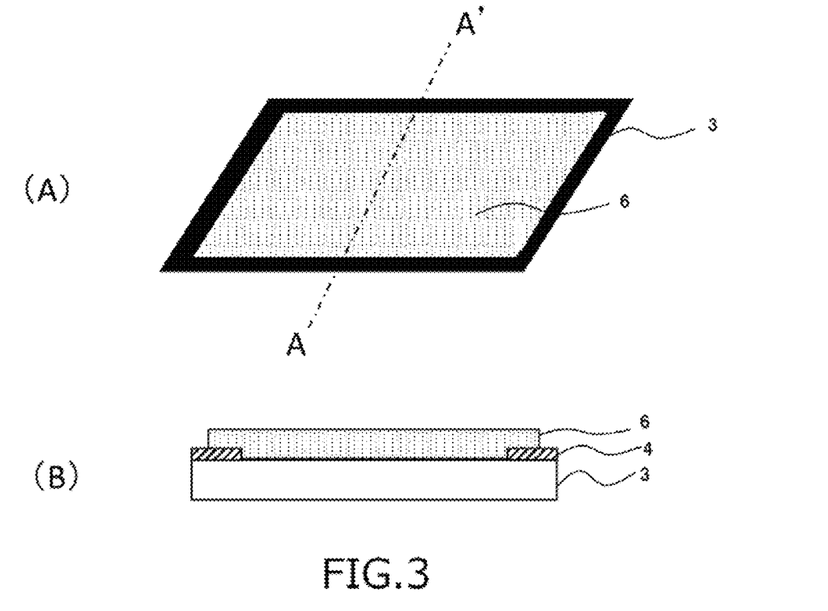

In step (A), for example, as shown in FIGS. 2, 3 (A), and 3 (B), the photocurable resin composition 6 is applied to the surface of the light transmitting member 3. The application of the photocurable resin composition 6 can be carried out by various application methods generally used; for example, as shown in FIG. 2, a coating apparatus having a coating head 8 having slit nozzles 7 can be used. In step (A), for example, as shown in FIG. 3 (B), it is preferable to apply the photocurable resin composition 6 thicker than the thickness of the light shielding layer 4. Specifically, the photocurable resin composition 6 is preferably applied to the entire surface of the light transmitting member 3 on the side of the light shielding layer 4 including the surface of the light shielding layer 4 with a thickness 1.2 to 50 times that of the light shielding layer 4, more preferably 2 to 30 times that of the light shielding layer 4. More specifically, the coating thickness is preferably 25 to 350 µm, more preferably 50 to 300 µm. The application of the photocurable resin composition 6 may be performed a plurality of times to obtain a required thickness.

Step (B)

Figure 4:
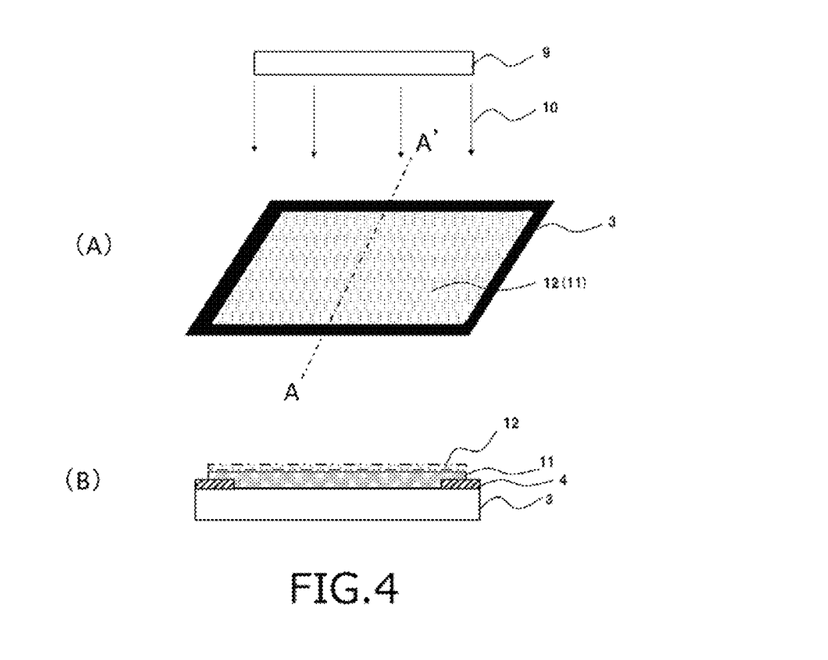

In step (B), for example, as shown in FIG. 4 (A), the photocurable resin composition 6 applied to the surface of the light transmitting member 3 is irradiated with ultraviolet rays 10 from the ultraviolet irradiator 9 to form a precured resin layer 11. By precuring the photocurable resin composition 6, the photocurable resin composition 6 can be kept in a state where it does not flow significantly from a liquid state, thereby improving handling ability.

The ultraviolet irradiation condition is preferably selected such that the curing rate of the precured resin layer 11 is 10 to 80%, more preferably 40 to 80%, and still more preferably 70 to 80%. Here, the curing rate is a numerical value defined by a ratio (consumption rate) of the amount of (meth) acryloyl group present in the photocurable resin composition 6 after light irradiation relative to the amount of (meth) acryloyl group present in the photocurable resin composition 6 before light irradiation. The larger the numerical value of the curing rate is, the more the curing of the photocurable resin composition progresses. Specifically, the curing rate can be calculated by substituting an absorption peak height (X) of 1640 to 1620 $cm^{-1}$ from the baseline in the FT-IR measurement chart of the photocurable resin composition 6 before light irradiation and an absorption peak height (Y) of 1640 to 1620 $cm^{-1}$ from the baseline in the FT-IR measurement chart of the photocurable resin composition 6 (precured resin layer 11) after light irradiation into the following formula.

Curing rate (%)=[(X−Y)/X]×100

The conditions of the light irradiation such as light source type, output power, illuminance, and integrated light quantity are not particularly limited as long as the curing rate of the photocurable resin composition 6 is preferably 10 to 80%.

As shown in FIG. 4 (B), for example, the surface of the precured resin layer 11 is covered with an uncured layer 12 made of a liquid component (for example, the specific monofunctional acrylic monomers described above) under the influence of the curing inhibition by oxygen. The thickness of the uncured layer 12 is usually about 10 µm. If the light transmitting member 3 and the image display member 2 are bonded to each other in a state where the surface of the precured resin layer 11 is covered with the uncured layer 12, a slippage tends to occur after the bonding, and adhesion might be in sufficient. Therefore, in the present manufacturing method, the surface of the precured resin layer 11 is dried in step (C) to volatilize the liquid components constituting the uncured layer 12.

Step (C)

Figure 5:
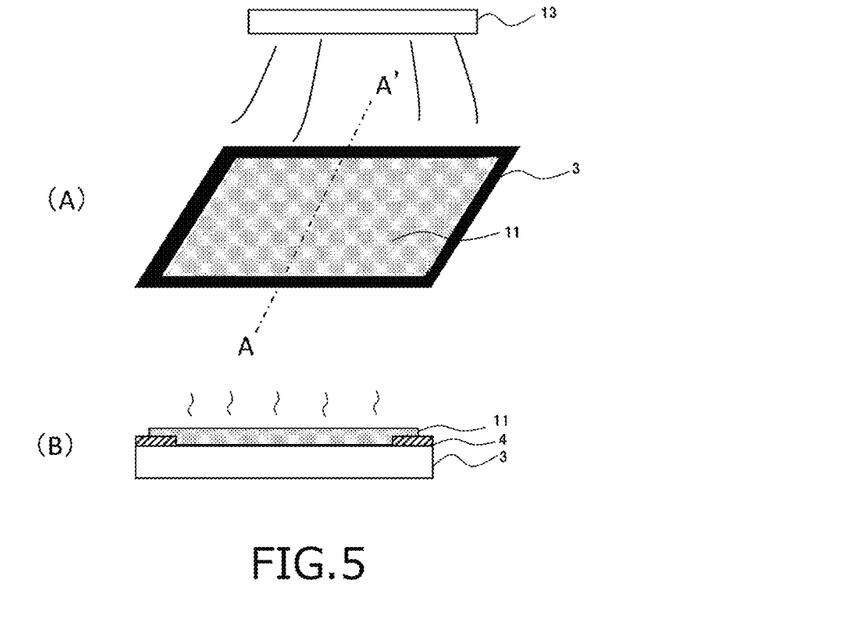

In step (C), for example, as shown in FIG. 5 (A), the surface of the precured resin layer 11 is dried by heat from a constant temperature dryer (constant temperature drying oven) 13. As a result, for example, as shown in FIG. 5 (B), the liquid component constituting the uncured layer 12 is volatilized, so that substantially no liquid component remains on the surface of the precured resin layer 11. The drying temperature is preferably set to a condition under which the liquid component constituting the uncured layer 12 easily volatilizes, and may be, for example, 60° C. or higher. In addition, the drying temperature is preferably not too high, for example, 80° C. or less, in consideration of the influence on the image display member 2 and the light transmitting member 3.

Figure 6:
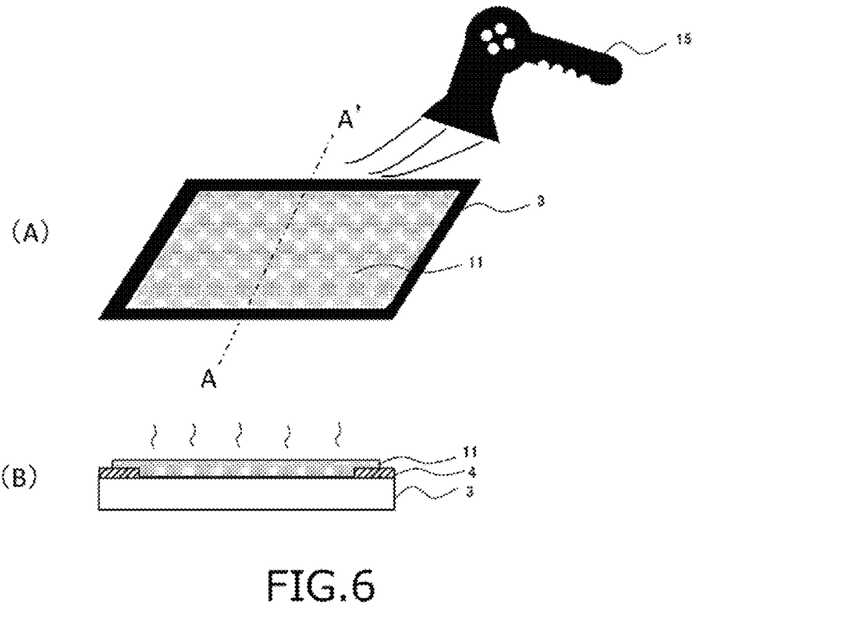

As the drying method, in addition to the method using the constant temperature dryer 13 as shown in FIG. 5 (A), the surface of the precured resin layer 11 may be dried by heat from the heating blower 15 such as a dryer as shown in FIGS. 6 (A) and (B).

Step (D)

Figure 7:
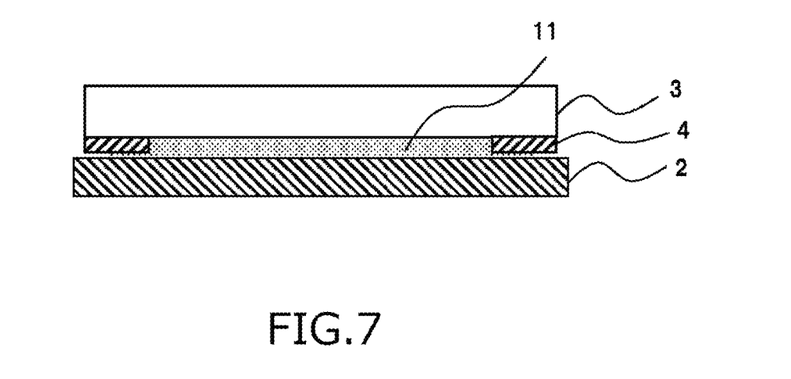
FIG. 7 is a cross-sectional view illustrating an example of a laminate in which an image display member and a light transmitting member are bonded via a precured resin layer.

In step (D), for example, as shown in FIG. 7, the image display member 2 and the light transmitting member 3 are bonded to each other via the precured resin layer 11. The bonding can be performed, for example, by applying pressure at 10 to 80° C. using a known press-fitting device.

Step (E)

Figure 8:
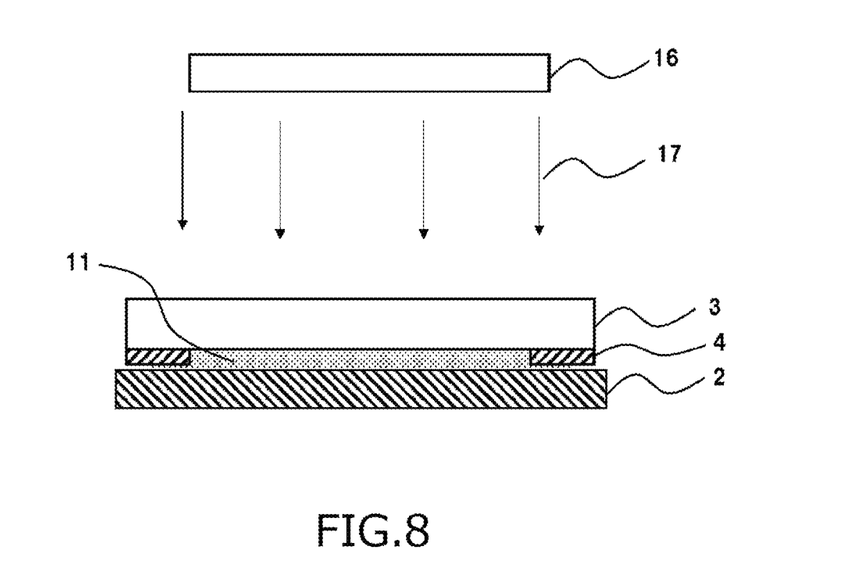
FIG. 8 is a cross-sectional view illustrating an example of a step of irradiating light on the precured resin layer to cause final curing.

In step (E), for example, as shown in FIG. 8, the precured resin layer 11 is irradiated with ultraviolet rays 17 from the ultraviolet irradiator 16, and the precured resin layer 11 is final-cured. Thus, the cured resin layer 1 (see FIG. 1) is formed.

The light irradiation in step (E) is preferably performed so that the curing rate of the cured resin layer 1 is 90% or more, more preferably 95% or more. The curing rate is the same as the curing rate described above. The irradiation condition of the ultraviolet rays such as light source type, output power, illuminance, and integrated light quantity are not particularly limited as long as the curing rate of the cured resin layer 1 is preferably 90% or more.

As described above, according to the present manufacturing method, by drying the surface of the precured resin layer 11 before step (D), the liquid component on the surface of the precured resin layer 11 can be volatilized. Therefore, the light transmitting member 3 and the image display member 2 can be bonded to each other in a state in which no liquid component remains substantially on the surface of the precured resin layer 11. As a result, it is possible to prevent slippage after the light transmitting member 3 and the image display member 2 are bonded, and the adhesion between the light transmitting member 3 and the image display member 2 can be improved.

Figure 9:
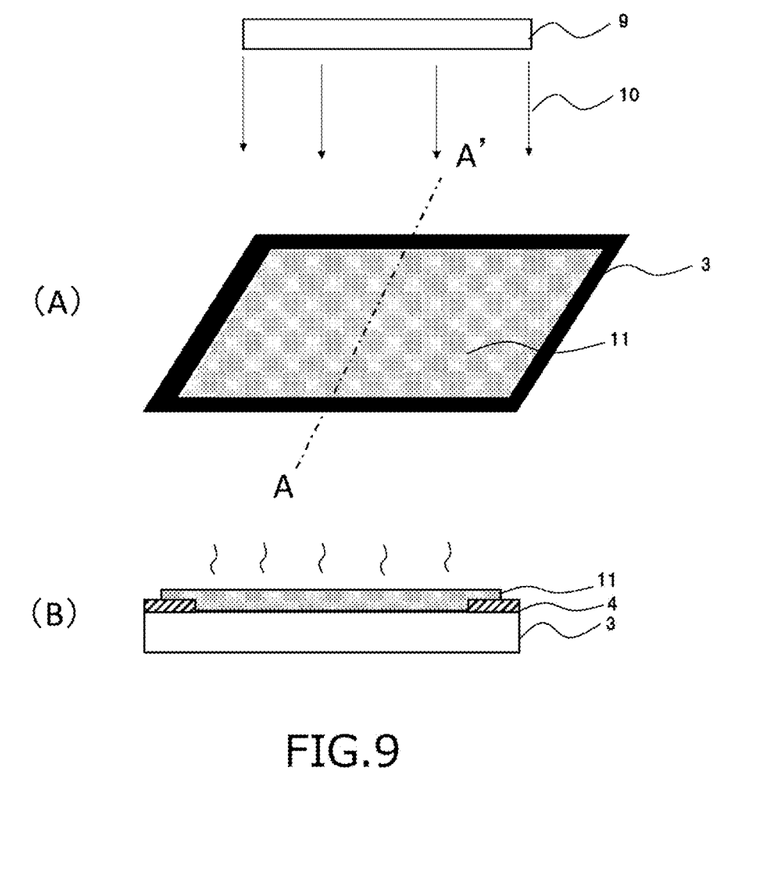

In the above-described manufacturing method, a method of heating using the constant temperature dryer 13 has been mentioned as a drying method in step (C), but the present invention is not limited to this method. For example, in addition to a method of heating, a method of reducing pressure, a method of blowing air, a method of irradiating with ultraviolet rays, and a combination of these methods, among other methods, may be used. As an example, in the method of irradiating with ultraviolet rays, the surface of the precured resin layer 11 is irradiated with ultraviolet rays to heat the precured resin layer 11, thereby drying the surface of the precured resin layer 11. More specifically, as shown in FIG. 9, in step (B), after the precured resin layer 11 is formed by irradiating with the ultraviolet rays 10 from the ultraviolet irradiator 9, the surface of the precured resin layer 11 may be further irradiated for a long time to dry the surface of the precured resin layer 11. That is, in step (B), both the formation of the precured resin layer 11 and the drying of the surface of the precured resin layer 11 can be performed.

Moreover, in the manufacturing method described above, the photocurable resin composition 6 is applied to the surface of the light transmitting member 3 on the side where the light shielding layer 4 is formed, but the present invention is not limited to this method. For example, the photocurable resin composition 6 may be applied to the surface of the image display member 2. In addition, in the above-described manufacturing method, the light transmitting member 3 having the light shielding layer 4 formed thereon is used, but the present invention is not limited to this example. For example, a light transmitting member having no light shielding layer may be used.

EXAMPLES

Examples of the present disclosure will be described below.

Monofunctional Acrylic Monomer

DEAA: diethylacrylamide, manufactured by KJ Chemicals Corporation

HPA: hydroxypropyl acrylate, manufactured by Osaka Organic Chemical Industry Ltd.

Viscoat #155: cyclohexyl acrylate, manufactured by Osaka Organic Chemical Industry Ltd.

Viscoat #150: tetrahydrofurfuryl acrylate, manufactured by Osaka Organic Chemical Industry Ltd.

Viscoat #160: benzyl acrylate, manufactured by Osaka Organic Chemical Industry Ltd.

Viscoat #192: phenoxyethyl acrylate, manufactured by Osaka Organic Chemical Industry Ltd.

IBXA: isobornyl acrylate, manufactured by Osaka Organic Chemical Industry Ltd.

NOAA: n-octyl acrylate, manufactured by Osaka Organic Chemical Industry Ltd.

LA: lauryl acrylate, manufactured by Osaka Organic Chemical Industry Ltd.

ISTA: isostearyl acrylate, manufactured by Osaka Organic Chemical Industry Ltd.

CHMA: cyclohexyl methacrylate, manufactured by Nippon Shokubai Co., Ltd.

Softening Agent

YS Polyster TH 130: terpene phenol, manufactured by YASUHARA CHEMICAL CO., LTD.

Hexamoll DINCH: cyclohexanedicarboxylic acid ester, manufactured by BASF

Crosslinking Agent

Miramer M200: hexanediol diacrylate, manufactured by MIWON

Photopolymerization Initiator

TPO: 2,4,6-trimethylbenzoyl-diphenyl-phosphine oxide, manufactured by BASF

Heating residue of monofunctional acrylic monomers

Figure 10:
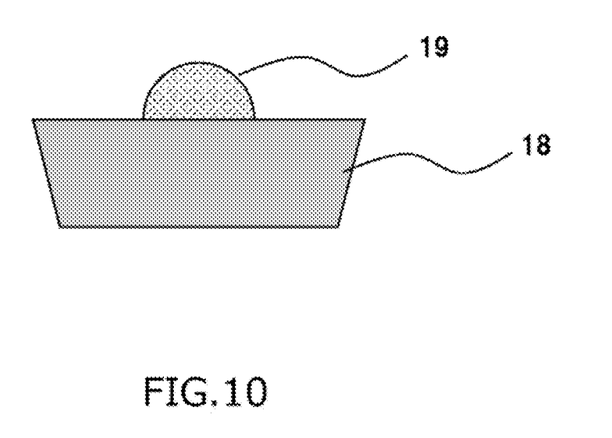
FIG. 10 is a view for explaining a method for measuring heating residues of a monofunctional acrylic monomer.

The heating residue (%) of each monofunctional acrylic monomer was measured using a calorimeter (device name: Q50, manufactured by TA Instruments). As shown in FIG. 10, specifically, 10 mg of monofunctional acrylic monomer 19 was placed in a container 18, and the mass was measured before and after heating the monofunctional acrylic monomer 19 at 60° C. for 30 minutes.

Preparation of Photocurable Resin Composition

Each component was uniformly mixed at the blending amount (mass part) shown in Table 1 to prepare a photocurable resin composition.

Heating residue of each photocurable resin composition

Figure 11:
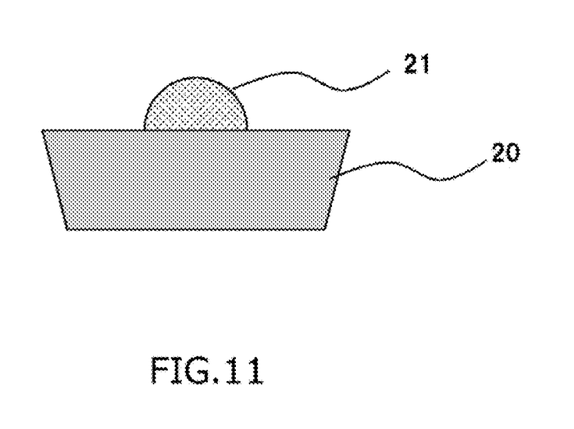
FIG. 11 is a view for explaining a method for measuring a heating residue of a photocurable resin composition.

The heating residue (%) of each photocurable resin composition was measured using a calorimeter (device name: Q50, manufactured by TA Instruments). As shown in FIG. 11, specifically, 10 mg of the photocurable resin composition 21 was placed in the container 20, and the mass of the photocurable resin composition 21 before and after being heated at 60° C. for 30 minutes was measured.

Transfer Test Before Drying (Before DRY)

Figure 12:
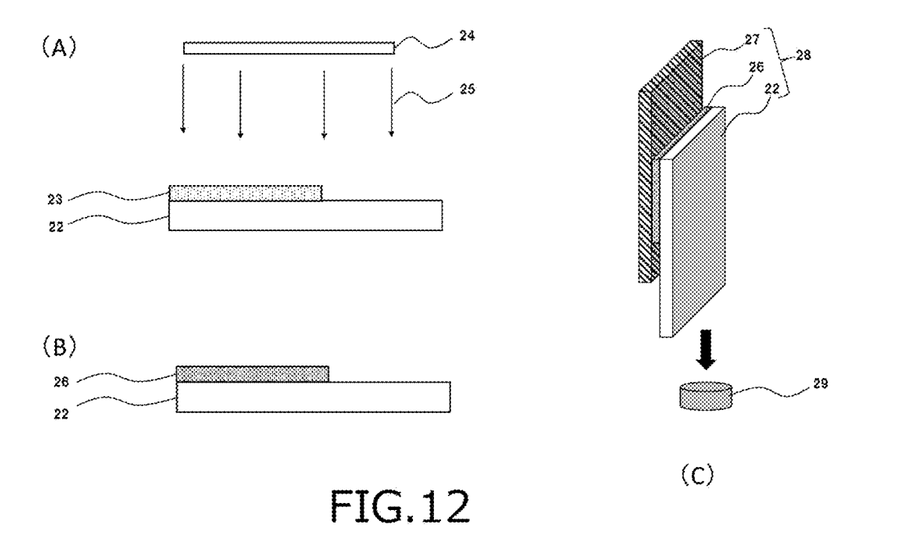

As shown in FIG. 12 (A), a photocurable resin composition was applied on a PET 22 having a thickness of 50 μm to form a resin composition layer 23 having a thickness of 0.15 mm. Next, the resin composition layer 23 was irradiated with ultraviolet rays 25 having an intensity of 200 mW/cm$^2$ by using UV-LED (wavelength: 365 nm) as the ultraviolet irradiator 24 so that the integrated light quantity reaches 3,000 mJ/cm$^2$. After the ultraviolet irradiation, the resin composition layer 26 (see FIG. 12 (B)) was allowed to stand at room temperature for 1 minute, and then subjected to a transfer test. In the transfer test, the oil blotting paper (product name: Gatsby oil blotting paper film type, manufactured by Mandom Corporation) was pressed against the resin composition layer 26 after ultraviolet irradiation, and the presence or absence of transfer of the resin composition layer 26 to the oil blotting paper was evaluated. Specifically, when the resin composition layer 26 is not transferred to the oil blotting paper, it is evaluated as good (hereinafter denoted as G); when the resin composition layer 26 is slightly transferred, it is evaluated as intermediate (hereinafter denoted as I); and when the resin composition layer 26 is transferred, it is evaluated as fail (hereinafter dented as F).

Holding Force Before Drying

The laminate 28 was prepared through the resin composition layer 26 before the transfer test so that the contact area between the glass 27 and the PET 22 was 25 mm×25 mm. Then, as shown in FIG. 12 (C), a load 29 of 1 kg was applied on the PET 22, and the amount of deviation (or the time until falling) of the PET 22 after 1 hour was measured using a holding force testing machine (device name: BE-501, manufactured by Tester Sangyo Co., Ltd.) When the PET 22 fell, it was evaluated as "F", and the time until it fell was measured. When the PET did not fall, it was evaluated as "G", and the amount of deviation after one hour was measured.

Transfer Test after Drying (after DRY)

The surface of the resin composition layer 26 after the ultraviolet irradiation was dried at 60° C. for 1 minute by heat from a constant temperature drying oven instead of leaving the resin composition layer 26 at room temperature for 1 minute, and thereafter, the transfer test was performed in the same manner as the transfer test before drying.

Holding Force after Drying

The same test as the holding force test before drying was carried out except that the surface of the resin composition layer 26 after the ultraviolet irradiation was dried at 60° C. for 1 minute by heat from a constant temperature drying oven instead of leaving the resin composition layer 26 at room temperature for 1 minute, and thereafter, the laminate 28 was prepared through the resin composition layer 26 before the transfer test.

TABLE 1

| | | residue after heating at 60° C. for 30 minutes (%) | Ex. 1 | Ex. 2 | Ex. 3 | Ex. 4 | Comp. 1 | Comp. 2 | Comp. 3 | Comp. 4 | Comp. 5 | Comp. 6 | Comp. 7 |
|---|---|---|---|---|---|---|---|---|---|---|---|---|---|
| monofunctional acrylic monomer | DEAA | 65.1 | 20 | — | — | — | — | — | — | — | — | — | — |
| | HPA | 84.4 | — | 20 | — | — | — | — | — | — | — | — | — |
| | Viscoat#155 | 49.6 | — | — | 20 | — | — | — | — | — | — | — | — |
| | Viscoat#150 | 83.1 | — | — | — | 20 | — | — | — | — | — | — | — |
| | Viscoat#160 | 90.9 | — | — | — | — | 20 | — | — | — | — | — | — |
| | Viscoat#192 | 98.6 | — | — | — | — | — | 20 | — | — | — | — | — |
| | IBXA | 90.1 | — | — | — | — | — | — | 20 | — | — | — | — |
| | NOAA | 87.1 | — | — | — | — | — | — | — | 20 | — | — | — |
| | LA | 99.4 | — | — | — | — | — | — | — | — | 20 | — | — |
| | ISTA | 99.8 | — | — | — | — | — | — | — | — | — | 20 | — |
| | CHMA | 66.4 | — | — | — | — | — | — | — | — | — | — | 20 |
| softening agent | YS Polyster TH130 | — | 60 | 60 | 60 | 60 | 60 | 60 | 60 | 60 | 60 | 60 | 60 |
| | Hexamoll DINCH | — | 20 | 20 | 20 | 20 | 20 | 20 | 20 | 20 | 20 | 20 | 20 |
| crosslinking agent | Miramer M200 | — | 0.1 | 0.1 | 0.1 | 0.1 | 0.1 | 0.1 | 0.1 | 0.1 | 0.1 | 0.1 | 0.1 |
| photopolymerization initiator | TPO | — | 1 | 1 | 1 | 1 | 1 | 1 | 1 | 1 | 1 | 1 | 1 |
| evaluation | total | | 101.1 | 101.1 | 101.1 | 101.1 | 101.1 | 101.1 | 101.1 | 101.1 | 101.1 | 101.1 | 101.1 |
| | residue after heating at 60° C. for 30 minutes (composition) (%) | | 95.4 | 95.1 | 94.1 | 95.9 | 97.2 | 99.5 | 98.5 | 97.5 | 99.9 | 100.0 | 95.6 |
| | transfer before DRY | | F | G | F | F | F | F | F | F | F | F | F |
| | holding force before DRY | | F 24 min | G 11 mm | F 9 min | F 5 min | F 5 min | F 8 min | F 2 min | F 0 min | F 0 min | F 0 min | F 0 min |
| | transfer after DRY | | G | G | G | G | I | I | I | F | F | F | I |
| | holding force after DRY | | G 6 mm | G 4 mm | G 9 mm | G 5 mm | F 17 min | F 12 min | F 6 min | F 1 min | F 0 min | F 0 min | F 13 min |

In Examples 1 to 4, by using a photocurable resin composition containing a monofunctional acrylic monomer having a heating residue of 85.0% or less after being heated at 60° C. for 30 minutes, a crosslinking agent, a photopolymerization initiator, and a softening agent composed of at least one of a plasticizer and a tackifier, and having a heating residue of less than 96%, it was found that the holding force after drying was good and the results of the transfer test were good. As a result, for example, by drying the surface of the precured resin layer before bonding the light transmitting members to each other, the light transmitting members can be bonded to each other with substantially no liquid component remaining. Therefore, the adhesion between the light transmitting members can be improved.

On the other hand, in Comparative Examples 1 to 6, since the photocurable resin composition having a heating residue of 96% or more was used, it was found that the holding force after drying was not good and the results of the transfer test were not good. In Comparative Example 7, a photocurable resin composition containing cyclohexyl methacrylate as a monofunctional acrylic monomer, that is, a photocurable resin composition not containing a monofunctional acrylic monomer having a heating residue of 85.0% or less after being heated at 60° C. for 30 minutes was used, so that the holding force after drying was not good and the results of the transfer test were not good. From these results, for example, even if the surface of the precured resin layer is dried before the light transmitting members are bonded to each other, it is difficult to improve the adhesion because the light transmitting members are bonded to each other while the liquid component remains.

REFERENCE SIGNS LIST

1 cured resin layer, 2 image display member, 3 light transmitting member, 4 light shielding layer, 5 image display device, 6 photocurable resin composition, 7 slit nozzle, 8 coating head, 9 ultraviolet irradiator, 10 ultraviolet rays, 11 precured resin layer, 12 uncured layer, 13 constant temperature dryer, 15 heating blower, 16 ultraviolet irradiator, 17 ultraviolet rays, 18 container, 19 monofunctional acrylic monomer, 20 container, 21 photocurable resin composition, 22 PET, 23 resin composition layer, 24 ultraviolet irradiator, 25 ultraviolet rays, 26 resin composition layer, 27 glass, 28 laminate, 29 load

The invention claimed is:

1. A photocurable resin composition comprising:
   10 to 30 mass % of a monofunctional acrylic monomer having a heating residue of 85.0% or less after being heated at 60° C. for 30 minutes;
   0.05 to 20 mass % of a crosslinking agent;
   a photopolymerization initiator; and
   a softening agent composed of at least one of a plasticizer and a tackifier;
   wherein the heating residue after being heated at 60° C. for 30 minutes is 94.1% or less.

2. A photocurable resin composition comprising:
   10 to 30 mass % of a monofunctional acrylic monomer having a heating residue of 85.0% or less after being heated at 60° C. for 30 minutes;
   0.05 to 20 mass % of a crosslinking agent;
   a photopolymerization initiator; and
   40 to 85 mass % of a softening agent composed of at least one of a plasticizer and a tackifier;
   wherein the heating residue after being heated at 60° C. for 30 minutes is 94.1% or less.

3. The photocurable resin composition according to claim 1,
   wherein the monofunctional acrylic monomer is at least one of a compound represented by formula (A), a compound represented by formula (B), and a compound represented by formula (C), wherein, in formula (A), $R^1$ and $R^2$ each independently represent an alkyl group having 2 to 4 carbon atoms,
   wherein, in formula (B), $R^3$ represents an unsubstituted alkyl group having 1 to 7 carbon atoms, and
   wherein, in formula (C), $R^4$ represents an aliphatic heterocyclic group having 3 to 6 carbon atoms, and $L^1$ represents a single bond or an alkylene group having 1 to 3 carbon atoms.

4. The photocurable resin composition according to claim 1,
   wherein the monofunctional acrylic monomer is at least one of diethylacrylamide, cyclohexyl acrylate, and tetrahydrofurfuryl acrylate.

5. A photocurable resin composition comprising:
   a monofunctional acrylic monomer having a heating residue of 85.0% or less after being heated at 60° C. for 30 minutes;
   a crosslinking agent;
   a photopolymerization initiator; and
   a softening agent composed of at least one of a plasticizer and a tackifier;
   wherein the heating residue after being heated at 60° C. for 30 minutes is 94.1% or less, and
   wherein the photocurable resin composition contains substantially no monofunctional acrylic monomers other than the monofunctional acrylic monomers.

6. The photocurable resin composition according to claim 3,
   wherein the monofunctional acrylic monomer is at least one of a compound represented by formula (A), a compound represented by formula (B), and a compound represented by formula (C), wherein, in formula (A), $R^1$ and $R^2$ each independently represent an alkyl group having 2 to 4 carbon atoms, wherein, in formula (B), $R^3$ represents an unsubstituted alkyl group having 1 to 7 carbon atoms, and wherein, in formula (C), $R^4$ represents an aliphatic heterocyclic group having 3 to 6 carbon atoms, and $L^1$ represents a single bond or an alkylene group having 1 to 3 carbon atoms.

7. The photocurable resin composition according to claim 6, wherein the monofunctional acrylic monomer is at least one of a compound represented by formula (A), a compound represented by formula (B), and a compound represented by formula (C), wherein, in formula (A), $R^1$ and $R^2$ each independently represent an alkyl group having 2 to 4 carbon atoms, wherein, in formula (B), $R^3$ represents an unsubstituted alkyl group having 1 to 7 carbon atoms, and wherein, in formula (C), $R^4$ represents an aliphatic heterocyclic group having 3 to 6 carbon atoms, and $L^1$ represents a single bond or an alkylene group having 1 to 3 carbon atoms.

8. The photocurable resin composition according to claim 2, wherein the monofunctional acrylic monomer is at least one of diethylacrylamide, cyclohexyl acrylate, and tetrahydrofurfuryl acrylate.

9. The photocurable resin composition according to claim 3, wherein the monofunctional acrylic monomer is at least one of diethylacrylamide, cyclohexyl acrylate, and tetrahydrofurfuryl acrylate.

10. The photocurable resin composition according to claim 1, wherein the photocurable resin composition contains substantially no monofunctional acrylic monomers other than the monofunctional acrylic monomers.

11. The photocurable resin composition according to claim 2, wherein the photocurable resin composition contains substantially no monofunctional acrylic monomers other than the monofunctional acrylic monomers.

12. The photocurable resin composition according to claim 3, wherein the photocurable resin composition contains substantially no monofunctional acrylic monomers other than the monofunctional acrylic monomers.

13. A photocurable resin composition comprising:

a monofunctional acrylic monomer having a heating residue of 85.0% or less after being heated at 60° C. for 30 minutes;

a crosslinking agent;

a photopolymerization initiator; and a softening agent composed of at least one of a plasticizer and a tackifier;

wherein the heating residue after being heated at 60° C. for 30 minutes is 94.1% or less, wherein the monofunctional acrylic monomer is at least one of diethylacrylamide, cyclohexyl acrylate, and tetrahydrofurfuryl acrylate, and wherein the photocurable resin composition contains substantially no monofunctional acrylic monomers other than the monofunctional acrylic monomers.

* * * * *